Feb. 28, 1939.　　　　J. R. SMITH　　　　2,149,190
AGRICULTURAL IMPLEMENT
Filed Jan. 31, 1938　　　2 Sheets-Sheet 1
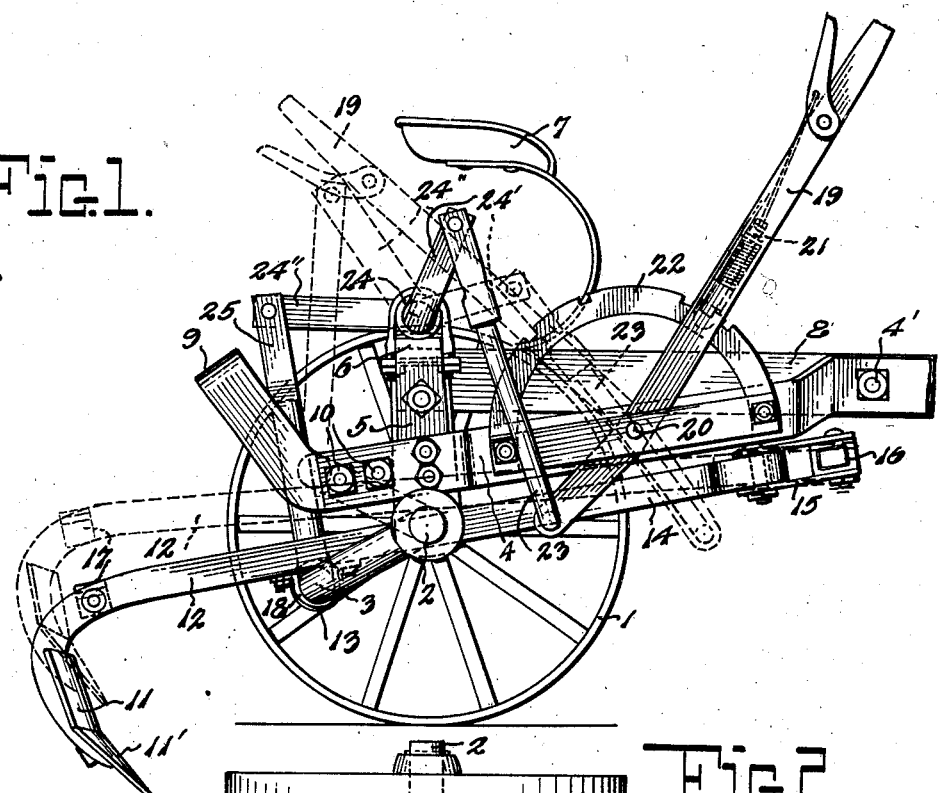
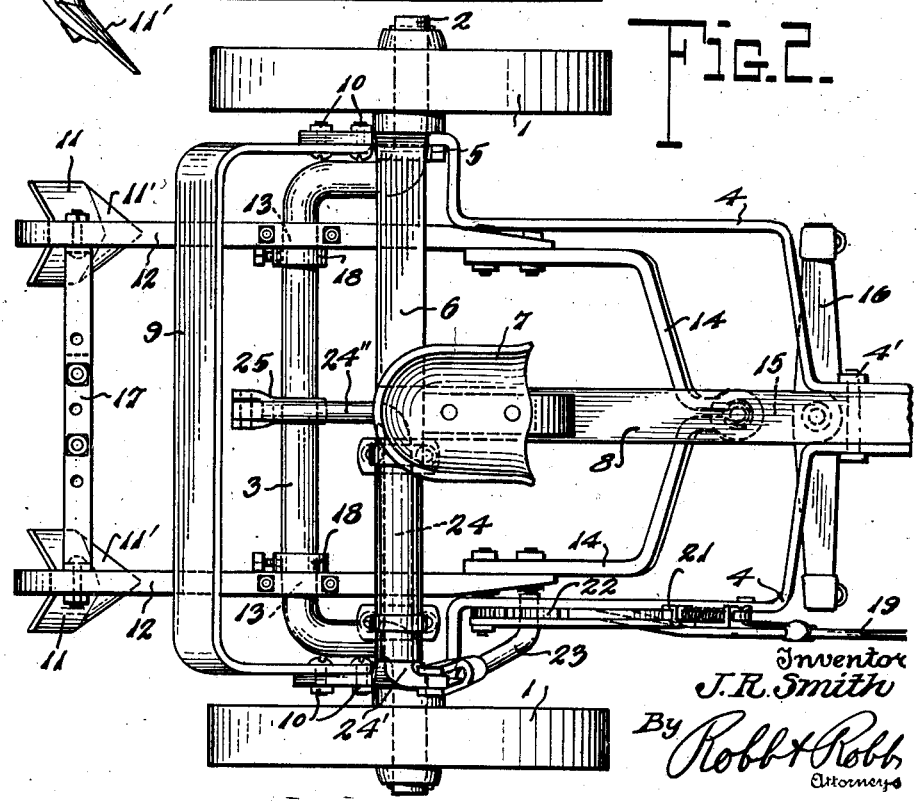
Inventor
J. R. Smith
By Robb & Robb
Attorneys Feb. 28, 1939.  J. R. SMITH  2,149,190
AGRICULTURAL IMPLEMENT
Filed Jan. 31, 1938   2 Sheets-Sheet 2
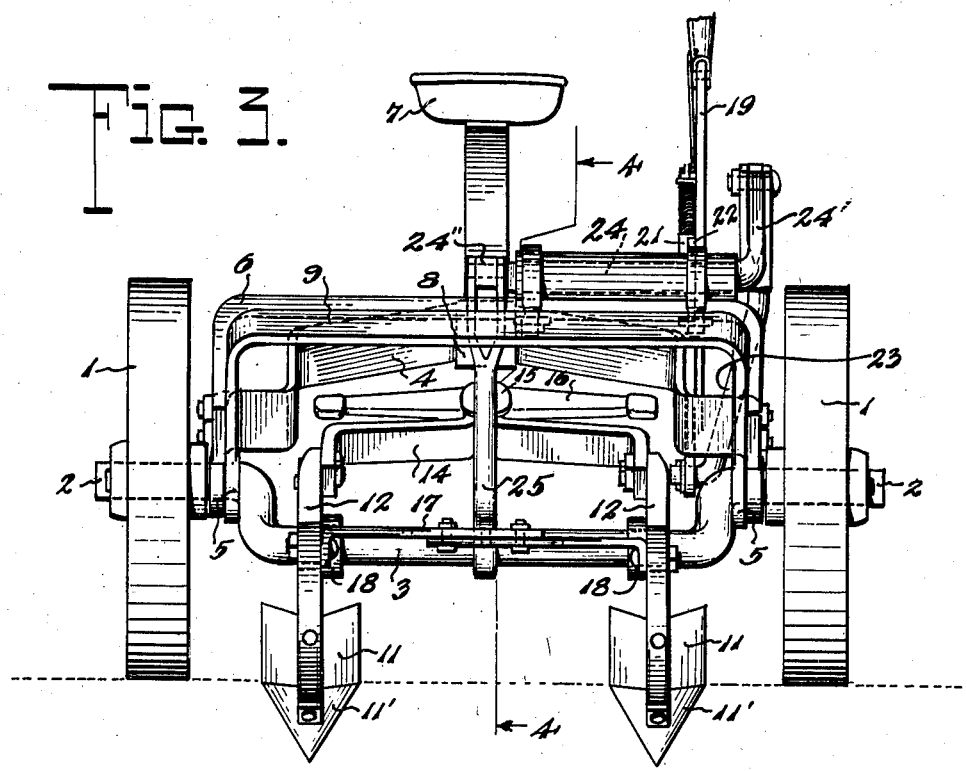
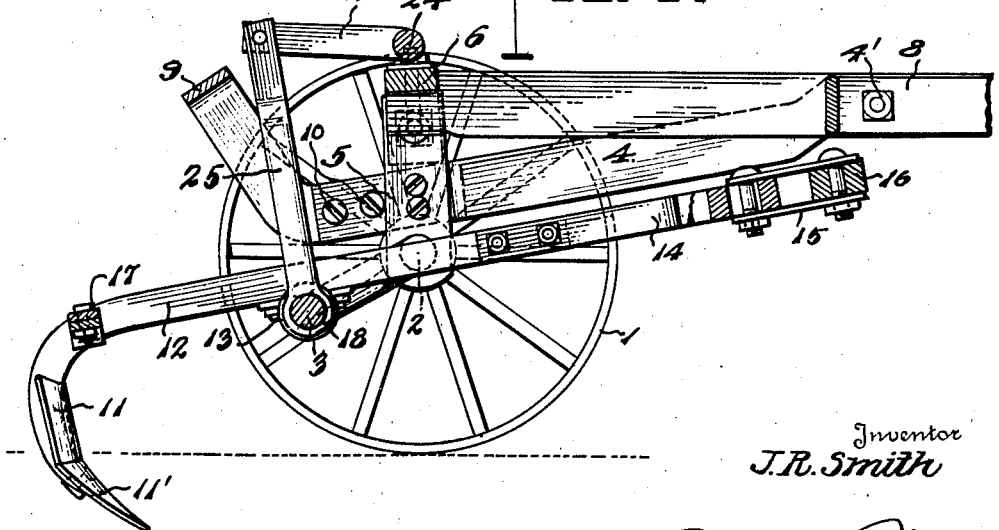
Inventor
J. R. Smith
By Robb & Robb
Attorneys Patented Feb. 28, 1939

2,149,190

UNITED STATES PATENT OFFICE 2,149,190

AGRICULTURAL IMPLEMENT

James R. Smith, Lehi, Utah

Application January 31, 1938, Serial No. 187,947

5 Claims. (Cl. 97—164)

The present invention relates to improvements in agricultural implements, particularly designed for use in connection with crops dependent upon irrigation, and by means of which to obtain uniform distribution of the water over the land covered by the crops.

In the western section of the United States especially, such crops as alfalfa can be grown upon more or less arid soils only by supplying moisture artificially thereto. This is customarily done by turning the water into the alfalfa fields to flow over the surface, but as these fields are usually uneven, this general system of flood distribution is not successful, frequently resulting in great losses.

This invention is designed to overcome the difficulties by providing earth working elements which will mark the field with defined, uninterrupted furrows through which the water may flow unimpeded and uniformly over the field.

In carrying out the invention, I provide a wheeled vehicle, the axle of which is formed into a crank and mount upon said crank section a plow frame which is capable of being adjusted to regulate the depth of the furrows according to the requirements of the ground being worked, and through the adjustment of the crank portion of the axle.

The primary object of my invention is to provide such a construction as above referred to in which the plow frame and implements connected thereto may not only be adjusted vertically by a crank axle, but may also have rocking adjustment about the same under the influence of draft connection to the plow frame.

A further object is to provide a sturdy implement which is capable of cutting the tough roots of the plants cleanly during the furrowing operation so as to prevent stoppage of the furrows and failure of flow of the water throughout the same.

Further objects reside in provisions for adjustment of the earth working instruments relative to each other and for the connection of the draft to the plow frame in such a manner as to relieve the tongue of downward pressure which would be transferred to the necks of the draft animals.

Other and further objects and advantages of the invention will be hereinafter set forth and the novel features thereof defined by the appended claims.

In the drawings:

Fig. 1 is a side elevation of a device constructed in accordance with my invention and showing the adjustment of the frame to and from operating position, the wheel on the near side being removed;

Fig. 2 is a top plan view;

Fig. 3 is a rear elevation; and

Fig. 4 is a longitudinal sectional view on the line 4—4 of Fig. 3.

Like reference characters designate corresponding parts in the several figures of the drawings.

Referring to the drawings, 1 indicates ground wheels mounted upon the axle spindles 2. Intermediate the spindles the axle is formed with a crank section 3 by means of which the earth working implements are adjusted in a manner to be more specifically described hereinafter.

The frame 4 of the machine is provided with vertical supports 5 having suitable apertures to receive the spindles 2, said supports being connected by the cross bar 6 on which the operator's seat 7 is mounted and to which the rear end of the tongue 8 is connected. At the front end the frame 4 is divided and fixedly secured to the tongue by bolts 4'.

The angularly disposed U-shaped end section 9 detachably connected by bolts 10 to the sides of the frame completes the main frame unit of the vehicle, said bar constituting a stop for limiting the swinging of the plow frame now to be described.

The earth working implements or plows 11 having replaceable points 11' are carried by the ends of the respective beams 12 which are mounted at intermediate points upon the crank section 3 of the axle by means of the clips 13, these beams being joined at the front ends by the draft yoke 14 carrying the usual clevis 15 for the single or double-tree 16.

It will be observed that the beams 12 together with the rear adjustable bar 17 and the front draw bar constitute a secondary frame which is capable of rocking movement on the axle crank section 3. Spacing collars 18 on the crank 3 hold this frame in proper relation on the crank.

The adjustment of the plow frame for regulating the depth of cutting action of the shovels or plows is accomplished by the lifting mechanism which includes the operating lever 19 pivoted intermediate its length to the frame 4 as at 20, the grip actuated latch bolt 21 engaging with a notched segment 22, the vertical link 23, the crank shaft 24 journaled on the cross bar 6 and the second vertical link 25 connected at one end to said shaft and at its other end to the crank section 3 about midway thereof.

It will be noted that the draft of the implement is connected directly to the plow frame and the draft causes the plows to embed themselves in the ground at the proper angle according to the depth adjustment to be described. By this arrangement the main frame 4 and tongue are entirely relieved of draft strains, enabling the frame to be made of relatively light material and eliminating the usual downward pressure upon the tongue of the implement.

Assuming that the plow frame and its adjusting mechanism is in the inoperative position shown in dotted lines in Fig. 1 of the drawings, when it is desired to cut furrows in the ground the lever 19 is shifted forwardly, as shown in full lines, moving the crank arm 24' rearwardly and the crank arm 24" downwardly. The crank section of the axle is thereby swung downwardly about the axis of its spindles until the proper depth adjustment is reached. Since the plow frame is free to rock about the crank 3, the draft on its forward end will determine the digging position and angle of the plows with respect to each adjustment of the crank toward or from the ground. The plow points are constructed to cut the tough roots of the alfalfa and to make cleared furrows at the proper spaced intervals according to the adjustment of the sectional connecting bar 17.

While I have shown only two plow beams, it is obvious that more or less of these may be provided and other changes may be made in the details of construction without departing from the spirit of the invention and within the scope of the claims hereto appended.

Having thus described my invention, what I claim as new and desire to secure by Letters Patent is:

1. An agricultural implement of the class described, comprising a main frame, an axle carried thereby having wheel spindles and a crank section, a plow frame comprising a pair of spaced parallel plow beams connected at their front ends and swingably mounted on the crank section, each plow beam having an earth working instrumentality at its rear end and a draft connection at its front end, said beams being free to swing about said crank section responsive to the draft forces, and mechanism on the main frame for raising and lowering the plow frame through the axle crank section including a lever at one side of the main frame, an operating shaft on the main frame extending to the center thereof formed with a crank extremity, and an operating connection on the crank extremity connected to the crank section of the axle intermediate of the plow beams.

2. An agricultural implement of the class described, comprising a wheeled vehicle including a crank shaft, a plow frame comprising a pair of spaced plow beams mounted intermediate their length on said crank shaft and secured together at their forward ends, a rear adjustable bar connecting the rear ends of the plow beams together, lifting and lowering means on said vehicle frame connected to the crank shaft intermediate the plow beams for raising and lowering said plow frame to control depth of plowing, and draft means connected to the front end of the plow frame for shifting the frame about the crank shaft into plowing position.

3. An agricultural implement of the class described, comprising a main frame, a tongue connected to said frame, an axle carried by said frame including wheel spindles and wheels mounted thereon and a crank section intermediate the wheel spindles, an earth working device comprising a plow beam pivotally mounted on the axle crank section at the mid-point of said plow beam so as to swing in a vertical plane under the action of the draft forces and having a plow device connected to its rear end and a draft connection at its front end to transmit said forces to the crank section directly, and means for adjusting the elevation of the plow beam with relation to the ground comprising a lever member and linkage connection from said member to the axle crank section whereby said crank section may be shifted about the axis of the spindles to thereby raise or lower the plow beam with respect to the ground.

4. An agricultural implement of the class described comprising a main frame, an axle mounted on said frame and comprising wheel spindles at the ends thereof and an intermediate crank section, said frame mounting being connected to the axle spindles, an earth working implement comprising a pair of plow beams rockably mounted upon the axle crank section and free to shift about the same responsive to draft forces, a draw bar connected to said plow beams transmitting the draft forces therethrough directly to the crank section, means intermediate said beams for adjusting the spaced relationship thereof, and means for adjusting the crank section of the axle to thereby raise or lower the plow beams.

5. An agricultural implement as set forth in claim 4, wherein the last-mentioned adjusting means is composed of a lever pivotally secured to the main frame, a crank shaft carried by said frame, and linkage connections between the lever and said crank shaft and the crank section of the axle.

JAMES R. SMITH.